United States Patent [19]

Harris

[11] Patent Number: 4,476,028

[45] Date of Patent: Oct. 9, 1984

[54] HEATER AND WATER PROBE

[75] Inventor: Robert S. Harris, Connersville, Ind.

[73] Assignee: Stant Inc., Connersville, Ind.

[21] Appl. No.: 487,974

[22] Filed: Apr. 25, 1983

[51] Int. Cl.³ .............................................. B01D 35/18
[52] U.S. Cl. ..................................... 210/774; 210/86; 210/184
[58] Field of Search .................. 210/85, 86, 103, 104, 210/114, 115, 185, 186, 187, 708, 799, DIG. 5, 744, 184, 774; 219/272, 273, 327, 333

[56] References Cited

U.S. PATENT DOCUMENTS

| 2,747,074 | 5/1956 | Finch | 219/241 |
| 4,010,101 | 3/1977 | Davey | 210/86 |
| 4,264,442 | 4/1981 | Jackson | 210/86 |
| 4,276,161 | 6/1981 | Matsui et al. | 210/86 |
| 4,334,989 | 6/1982 | Hall | 210/262 X |

Primary Examiner—Richard V. Fisher
Assistant Examiner—W. Gary Jones
Attorney, Agent, or Firm—Barnes & Thornburg

[57] ABSTRACT

A fuel-water separator having a housing, and a heating element within the housing is provided with a sensor for sensing the presence of accumulated water within the housing above a specified depth. The sensor includes an electrically conductive probe which is hollowed to encase the heating element and mounted to project downward within the housing. A voltage source is provided for applying a voltage between the conductive probe and the housing. The housing and the voltage source are commonly grounded. An indicator is electrically interposed between the voltage source and the conductive probe.

7 Claims, 1 Drawing Figure

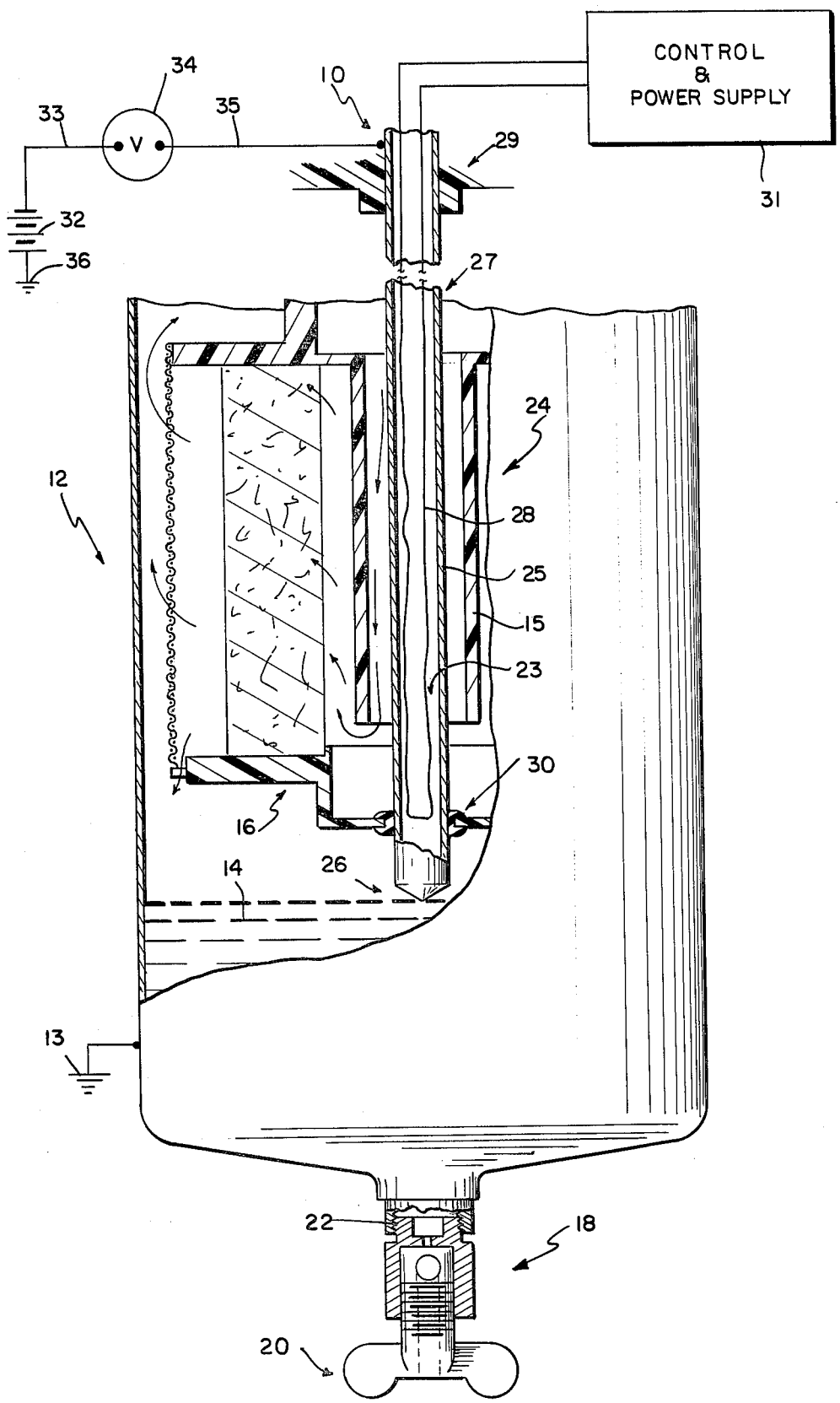

HEATER AND WATER PROBE

This invention relates to fuel line devices, and more particularly to a fuel-water separator which further includes a sensor to detect the presence of a specified depth of accumulated water within a portion of the device.

Fuel for internal combustion engines is often contaminated with impurities such as particulate matter and water which becomes entrained in the fuel. The presence of these impurities can deleteriously affect engine performance. The problems associated with entrained impurities are especially acute with diesel engines, as diesel fuel tends to be more highly contaminated than gasoline.

To solve the above-mentioned problem, it is often advisable to install filters and fuel-water separators in the fuel line to trap entrained particles and separate entrained water from the fuel, respectively. Frequently, a fluid treatment means, such as a heating element, is located within the fuel-water separator to prevent fuel and entrained water from becoming unacceptably viscid during cold weather motoring.

In fuel-water separators, water which has been separated from fuel is generally accumulated in a reservoir at the base of the separator. Drainage of this water can typically be accomplished by manually opening a petcock that is disposed in a lower central opening of the water reservoir.

A major problem with the drainage of water from fuel-water separators is that it is difficult to accurately monitor the depth of accumulated water. Since the ratio between the quantity of water entrained in fuel and the quantity of fuel filtered by the separator is not constant, it is difficult to predict the volume of separated water that has accumulated over a period of time. Failure to drain the reservoir in a timely manner may cause the accumulated water to overflow the reservoir and partially clog the separator or possibly damage the engine. Precautionary draining of the reservoir is an unproductive use of time and effort if performed when the reservoir is nearly empty. A means for indicating when the reservoir should be drained would reduce the threat of reservoir overflow and thus minimize time-consuming unnecessary reservoir drainings.

In accordance with the present invention, in a water separator having a housing and a heating element within the housing, a sensor is provided for sensing the presence of accumulated water within the housing above a specified depth. The sensor includes means for sensing the water level within the separator, the sensing means being contiguous to the heating element and projecting downward within the housing to the preselected level from a point above the preselected level. The sensor also includes means for grounding the housing, means for electrically insulating the sensing means from the housing, and means for electrically insulating the heating element from the sensing means. The sensor can include an electrically conductive probe or sheath disposed within the housing, the heating element being encased by the probe, and means for electrically connecting the probe to an external indicator whereby the accumulation of water, an electrically conductive liquid, above the specified depth will activate the indicator.

One feature of the present invention is that a means is provided for automatically detecting when the accumulation of water within the separator has surpassed a preselected level. This feature has the advantage of automatically notifying the user of the separator when the accumulated water needs to be discharged. Unless the water level is carefully monitored, and drained at the proper time, the volume of water separated from the filtered fuel may completely fill the water reservoir and overflow into the filtering channels and cavities. Overflow significantly impairs operability of the separator.

Another feature of the present invention is that the sheath of the heater element within the separator is made from an electrically conductive material. This feature allows the heater assembly to serve as a portion of an electrical continuity circuit. This arrangement is advantageous because it conserves valuable space in the crowded separator interior by eliminating the need to insert an additional probe in the cavity of the separator. The heater element is a mandatory component in a separator since it prevents fuel and water in the separator from freezing or gelling in cold weather. In the present invention, the heater element may easily be adapted to serve in a dual capacity as a heater and a water level detection probe.

A further advantage of the present invention is that it is easy to install since it is an electrical system. The heater/water level detection probe is positively charged and the container in which the water accumulates is grounded. Water is an electrically conductive liquid; therefore, as soon as the accumulated water rises to a level where the lower tip of the heater/probe is intercepted, an open electrical continuity circuit will be closed to activate a water level indicator.

The sole FIGURE of the drawing illustrates the water separator of the invention.

Additional features and advantages of the invention will become apparent to those skilled in the art upon consideration of the following detailed description of the preferred embodiment exemplifying the best mode of carrying out the invention as presently perceived. The detailed description particularly refers to the accompanying FIGURE.

The drawing shows a portion of the fuel-water separator 10 of the present invention comprising an upright cylindrical housing or container 12 having a lower reservoir portion 14 wherein water separated from the fuel in the fuel line (not shown) is stored, and a filter assembly 16 disposed within the cylindrical housing 12. Incoming fuel is conducted vertically downward by cylindrical baffle 15 to provide more opportunity to contact heated sheath 25 and better heat the fuel. The housing 12 is electrically grounded at 13 and has an inlet and outlet (not shown) for receiving and discharging fluid.

A central opening 18 is formed at the bottom of the reservoir portion 14 of the housing 12 to provide a drainage port for water accumulated at the bottom of the reservoir 14. A petcock 20 is threaded into a threaded tube 22 brazed into the central opening 18. By opening and closing petcock 20, drainage of the water from reservoir 14 can be controlled.

An electrical heater 24 is mounted in the interior of the housing 12 so that it may heat a stream of fluid passing through the separator 10. The heater 24 includes a sheath 25 and a resistive heating element 28 encased within the sheath 25. The heating element 28 is electrically insulated from the sheath 25 by insulating means 23. For example, air space between the two elements would provide a satisfactory insulator, through a non-conductive ceramic is more common. Heat is generated by placing the heating element 28 in series with a power supply and control unit 31, and then transferred to the surrounding liquid by conduction through the sheath 25. The sheath 25 is preferably formed out of an electrically conductive material and is electrically insulated by insulators 29 and 30 from the housing 12. The sheath 25 is mounted so that the lower end 26 of the sheath 25 is located within the housing 12 a specified distance above the bottom of the reservoir portion 14 and the upper end 27 is located outside the reservoir portion 14.

A voltage is applied between the upper end 27 of the sheath 25 and the housing 12 by a voltage source 32. The positive terminal of the voltage source 32 is electrically connected to one terminal of a continuity indicator 34 via conductor 33. The other terminal of the continuity indicator 34 is electrically connected to upper end 27 of the sheath 25 via conductor 35. For example, the continuity indicator 34 may be a meter, light bulb, or any resistive instrument which may be activated to indicate the existence of an applied voltage across its two terminals. Typically, a warning light on the instrument panel of the motor vehicle is used for the indicator 34. The negative terminal of the voltage source 32 is grounded at 36 so that the voltage source 32 and the housing 12 are commonly grounded.

The voltage source 32, conductor 33, continuity indicator 34, conductor 35, sheath 25, and housing 12 cooperate in series to form a generally open electrical circuit. The circuit may be closed by establishing electrical contact between the lower end 26 of the sheath 25 and the grounded housing 12.

In the present invention, water which has been separated from the fuel will continue to accumulate within the lower reservoir portion 14 of the housing 12 until it contacts the lower end 26 of the sheath 25. Water, being an electrically conductive liquid, functions as the "throw-lever" of an electrical switch by establishing electrical contact between the sheath 25 and housing 12 as soon as it accumulates above the preselected depth. Closure of the circuit will activate the continuity indicator 34. In this manner, the user of the fuel-water separator 10 will receive advanced warning that the separated water within the lower reservoir portion 14 has accumulated to such a depth that it should be drained. Draining is accomplished by manually opening the petcock 20.

Although the invention has been described in detail with reference to certain preferred embodiments and specific examples, variations and modifications exist within the scope and spirit of the invention as described and defined in the following claims.

What is claimed is:

1. In a fuel-water separator having a housing and a heating element disposed within the housing, a sensor for sensing the presence of accumulated water above a specified depth within the housing, the sensor comprising an electrically conductive probe, the probe being disposed within the housing and encasing the heating element, means for grounding the housing, a voltage source having two electrodes, the first electrode electrically communicating with the conductive probe, and the second electrode being grounded, and an indicator communicating with both the first electrode and the conductive probe whereby the accumulation of water above the specified depth will activate the indicator.

2. A water separator comprising an electrically continuous container having an inlet and an outlet and within which is situated means for separating water from a stream of fluid passing therethrough, and a reservoir for retaining water separated from the stream of fluid below a preselected level, fluid treatment means for heating the fluid within the separator, sensing means for sensing the water level within the separator, the sensing means being contiguous to the fluid treatment means and projecting downward within the container to the preselected level from a point above the preselected level, and means for electrically insulating the sensing means from the container.

3. The water separator of claim 2 wherein the sensing means substantially completely envelops the fluid treatment means.

4. The water separator of claim 2 wherein the fluid treatment means comprises an electrical heater for heating the stream of fluid passing through the separator, and means for electrically insulating the heater from the sensing means.

5. The water separator of claim 2 further comprising means for electrically connecting the sensing means to an indicator located outside the container, the indicator being electrically connected to the container.

6. In a water separator including means defining an inlet and an outlet and means for separating water from fuel passing therethrough, a probe for insertion into the water separator, the probe comprising a sheath of electrically conductive material, a fluid treatment means situated within the sheath for heating a fluid outside the sheath, means for electrically insulating the sheath, and means for electrically connecting the sheath to an external indicator for indicating the level of water within the separator.

7. In a fuel-water separator having a housing and a heating element disposed within the housing, a method for detecting the presence of accumulated water within the housing, comprising the steps of enclosing the heating element within an electrically conductive sheath, grounding the housing, applying a specified voltage between the conductive sheath and the grounded housing from a voltage source, allowing accumulated water within the housing to contact the sheath at a specified depth, and interposing an indicator between the voltage source and the conductive sheath such that an accumulation of water above the specified depth will activate the indicator.

* * * * *